(12) United States Patent
Parker

(10) Patent No.: US 9,164,808 B2
(45) Date of Patent: Oct. 20, 2015

(54) VIRTUAL CONTAINER FOR NETWORK SYSTEMS

(75) Inventor: Benjamin J. Parker, Foster City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 551 days.

(21) Appl. No.: 13/554,324

(22) Filed: Jul. 20, 2012

(65) Prior Publication Data

US 2014/0026133 A1    Jan. 23, 2014

(51) Int. Cl.
| | |
|---|---|
| *G06F 9/46* | (2006.01) |
| *G06F 9/455* | (2006.01) |
| *G06F 15/173* | (2006.01) |
| *G06F 9/50* | (2006.01) |

(52) U.S. Cl.
CPC .......... *G06F 9/5083* (2013.01); *G06F 9/45558* (2013.01); *G06F 2009/4557* (2013.01)

(58) Field of Classification Search
None
See application file for complete search history.

(56) References Cited

U.S. PATENT DOCUMENTS 7,577,959 B2 *   8/2009   Nguyen et al. ................ 718/105

\* cited by examiner

*Primary Examiner* — Meng An
*Assistant Examiner* — Bing Zhao

(57) ABSTRACT

A first server is configured to receive performance data associated with a first virtual machine. The first virtual machine may be capable of communicating with a client device. The first server is further configured to determine whether the first virtual machine is overloaded based on the performance data, and send an instruction to a second server to generate a second virtual machine based on determining that the first virtual machine is overloaded. The second virtual machine may be capable of communicating with the client device. The first server is further configured to instruct the second virtual machine to communicate with the client device to reduce network load associated with the first virtual machine.

13 Claims, 10 Drawing Sheets

VIRTUAL CONTAINER FOR NETWORK SYSTEMS

BACKGROUND

Client devices sometimes communicate with multiple servers and/or multiple network devices (e.g., routers, gateways, switches, etc.) to perform a task, (e.g., provide data forwarding services to user devices, update data stored by the multiple servers, etc.). Communicating with multiple servers and/or multiple network devices may increase network traffic, associated with a network. Physical network devices are sometimes added to increase network capacity associated with the network.

DETAILED DESCRIPTION OF THE PREFERRED EMBODIMENTS

Figure 1:
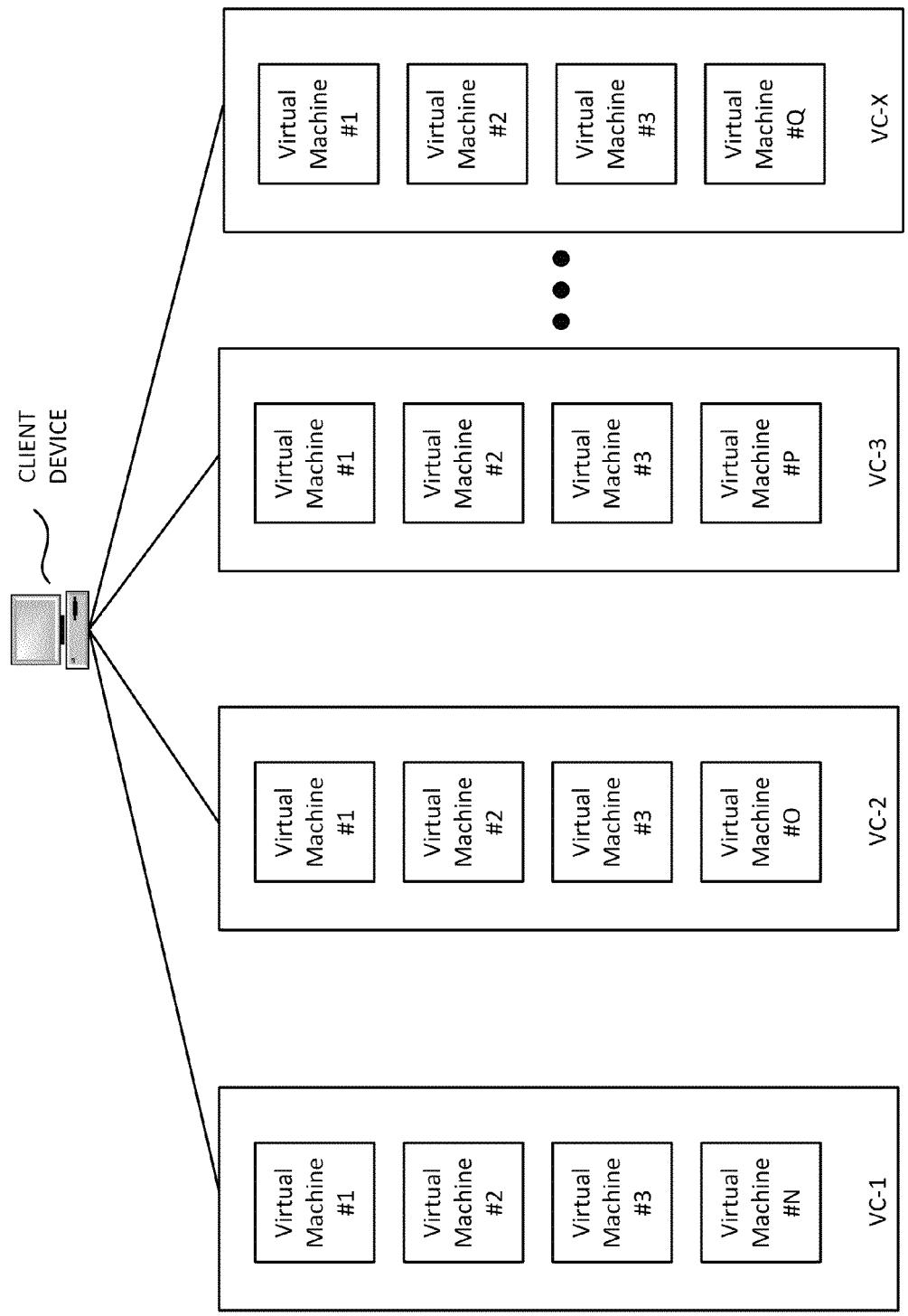
FIG. 1 illustrates an example overview of an implementation described herein.

The following detailed description refers to the accompanying drawings. The same reference numbers in different drawings may identify the same or similar elements.

Systems and/or methods, as described herein, may provide multiple virtual containers each including multiple virtual machines. Each virtual machine may include an individual virtual element to perform a specific function (provide data forwarding services, store information for user profile accounts, store billing information for a service, generate packets, such as simple network management protocol (SNMP) packets, in the context of providing a service, etc.). In some implementations, each virtual container may include virtual machines associated with a particular function (e.g., one virtual container may include virtual machines for performing data forwarding services while another virtual container may include virtual machines for storing and/or processing billing information for users associated with a service provider). A virtual machine may include a virtual platform that may function similar to a physical device, such as a server, a gateway, or another type of network device.

In some implementations, a client device may communicate with a single virtual container (e.g., via a virtual internet protocol (IP) address associated with the virtual container) to perform a task associated with the virtual container, thereby reducing network traffic with respect to the client device communicating with multiple physical devices. Additionally, or alternatively, a virtual container may aggregate data flows associated with packets (e.g., SNMP packets) generated by virtual machines within the virtual container, to form a single aggregated data flow such that the single aggregated data flow may be presented to the client device via the virtual IP.

A virtual machine may include performance indicators and thresholds associated with the performance indicators (e.g., to identify network load associated with the virtual machine and the corresponding virtual container). Additional virtual machines may be added to a virtual container (e.g., to add network capacity associated with the virtual container and/or to reduce network load of an overloaded virtual machine), in lieu of adding physical devices. Further, virtual machines may be removed from a virtual container (e.g., to prevent an overloaded virtual machine from malfunctioning the virtual container, or to create space in the virtual container by removing an under-loaded virtual machine which may not be needed). Additionally, or alternatively, multiple virtual machines may be combined into a single virtual machine (e.g., to combine functions performed by multiple under-loaded virtual machines into a single virtual machine). Additionally, or alternatively, virtual machines may be moved from one virtual container to another virtual container.

In some implementations, a virtual container may include virtual machines associated with multiple geographic locations (e.g., data centers associated with different geographic locations). For example, a virtual container may include a virtual machine to perform services associated with one geographic location and may include another virtual machine to perform services associated with another geographic location. Additionally, a virtual container may reallocate network traffic for virtual machines associated with one geographic location to virtual machines associated with another geographic location.

FIG. 1 illustrates an example overview of an implementation described herein. As shown in FIG. 1, a client device may communicate with multiple virtual containers (e.g., VC-1 through VC-X, where X≥1). As described above, each virtual container may include multiple virtual machines to perform a specific function. For example, VC-1 may include virtual machines to perform data forwarding functions (e.g., in a similar manner to a packet data network (PDN) gateway (PGW), a serving gateway (SGW), or some other network device). VC-2 may include virtual machines to store and/or process billing information for users of a service provider, such a home internet service provider, a mobile phone service provider, etc. (e.g., in a manner similar to a home subscriber server (HSS) or some other server). VC-3 through VC-X may include virtual machines to perform some other functions. As described above, the client device may communicate with a virtual container via a single virtual IP address. In some implementations, the virtual container may include private IP addresses associated with each virtual machine (e.g., to allow the virtual container to communicate with an individual virtual machine).

In some implementations, a client device may communicate with a single virtual container (e.g., in lieu of communicating with multiple physical devices) to perform a function associated with the virtual container. As a result, network traffic may be reduced with respect to situations where the client device communicates with multiple physical devices.

Figure 2:
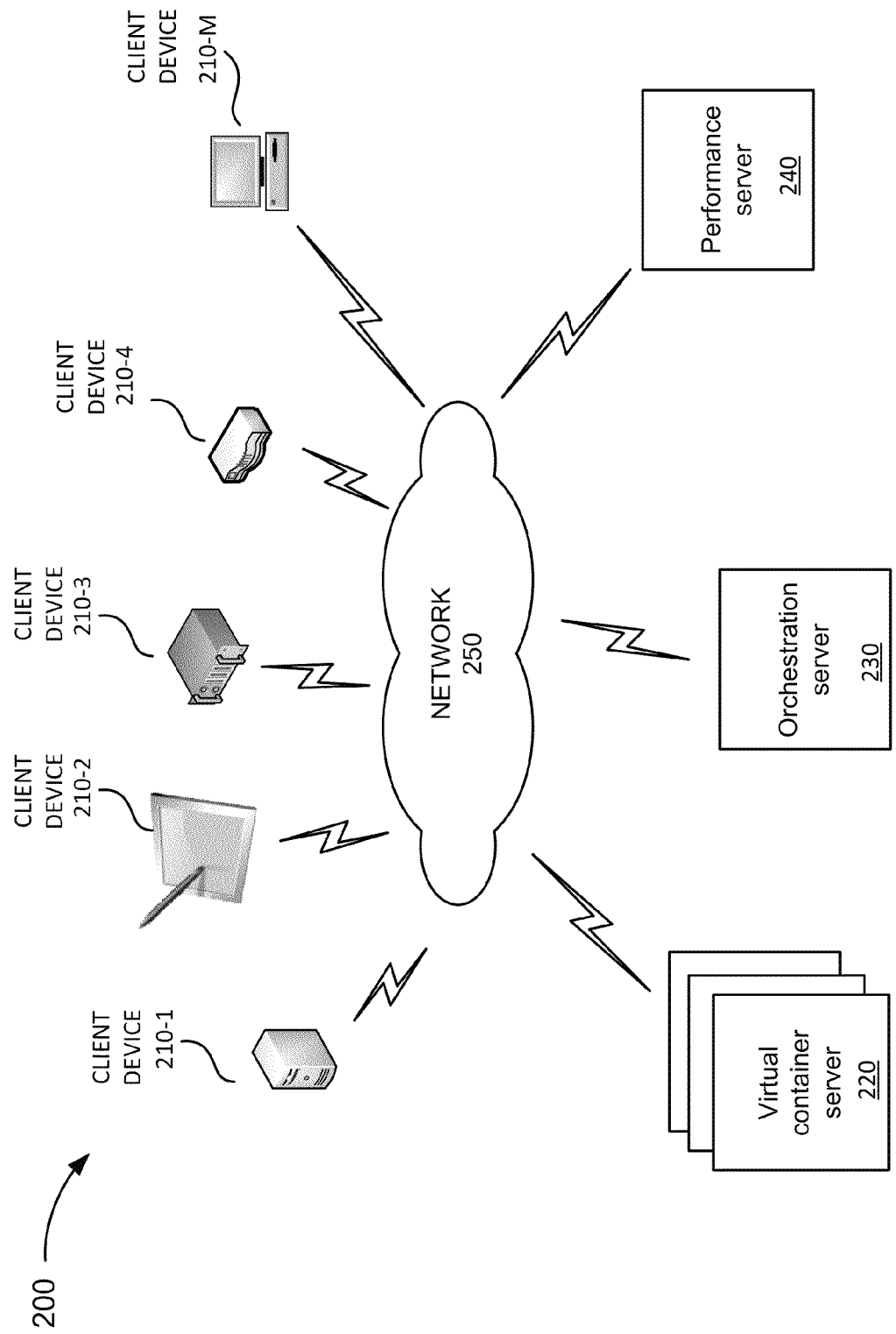
FIG. 2 illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include client devices 210-1, 210-2, ..., 210-M (where M≥1) (collectively referred to as "client devices 210," and individually as "client device 210"), virtual container server 220, orchestration server 230, performance server 240, and/or network 250. While FIG. 2 shows a particular quantity and arrangement of devices, in practice, environment 200 may include additional devices, fewer devices, different devices, or differently arranged devices than are shown in FIG. 2. For example, each of servers 220-240 may be implemented as multiple, possibly distributed, devices. Alternatively, two or more of servers 220-240 may be implemented within a single device. Further, a function described as being performed by one server may be performed by another server.

Client device 210 may include any portable or non-portable device capable of communicating via a network, such as network 250. For example, client device 210 may correspond to a mobile communication device (e.g., a smart phone or a personal digital assistant (PDA)), a portable computer device (e.g., a laptop or a tablet computer), a non-portable computer device (e.g., a desktop computer device, a desktop server, or a rack-mountable server), a network device (e.g., a router, a network switch, a gateway, etc.), or some other type of device. In some implementations, client device 210 may communicate with virtual container server 220 to perform a task (e.g., provide data forwarding services, store information for user profile accounts, store billing information for a service, etc.).

Virtual container server 220 may include a computing device, such as a server device or a collection of server devices. In some implementations, environment 200 may include multiple virtual container servers 220 such that each virtual container server 220 stores multiple virtual containers. For example, one instance of virtual container server 220 may store a virtual container having multiple virtual machines to perform data forwarding functions (e.g., in a similar manner to a PGW, an SGW, or some other network device). Another instance of virtual container server 220 may store a virtual container having virtual machines to store and/or process billing information for a service, such as a home internet service, a mobile phone service, etc. (e.g., in a manner similar to a home subscriber server (HSS) or some other server). Another instance of virtual container server 220 may store a virtual container having virtual machines to perform some other function. In some implementations, client device 210 may communicate with virtual containers via virtual container server 220 to perform some task (e.g., data forwarding services, billing services associated with a service provider, etc.).

Virtual container server 220 may receive instructions from orchestration server 230 to add, remove, combine, or migrate (i.e., move) virtual machines associated with virtual containers stored by virtual container server 220. In some implementations, virtual container server 220 may provide performance data, associated with performance indicators (e.g., roundtrip delay, bandwidth, data rates, transfer jitter, affinity and/or anti-affinity), to performance sever 240. For example, virtual container server 220 may monitor and/or store performance data for a performance indicator (e.g., data rates) associated with a virtual container or with virtual machines within a virtual container when virtual container server 220 communicates with client device 210. In some implementations, performance data may relate to the network load associated with virtual machines implemented by virtual container server 220 (e.g., network load associated with communicating with client device 210). In some implementations, virtual container server 220 may provide the performance data to performance server 240.

Orchestration server 230 may include a computing device, such as a server device or a collection of server devices. In some implementations, orchestration server 230 may store data associated with the topology of virtual container server 220. For example, orchestration server 230 may store information for a virtual container (or multiple virtual containers) associated with virtual container server 220, such as the type of service provided by the virtual container, a virtual IP address associated with the virtual container, and information for a virtual machine (or multiple virtual machines) associated with the virtual container (e.g., a virtual machine identifier (ID), performance data for the virtual machine, etc.). Orchestration server 230 may also receive instructions from performance server 240 to add, remove, combine, or migrate virtual machines within a virtual container based on performance data associated with the virtual machines.

Performance server 240 may include a computing device, such as a server device or a collection of server devices. In some implementations, performance server 240 may receive performance indicators, thresholds associated with the performance indicators, and/or performance data associated with the performance indicators from virtual container server 220. For example, performance server 240 may receive performance data (e.g., 90 gigabits per second (Gbps)), a threshold (e.g., 100 Gbps) associated with a performance indicator (e.g., data rates) associated with a virtual machine from virtual container server 220. As described above, performance data may relate to the network load associated with virtual machines stored by virtual container server 220 (e.g., network load associated with communicating with client device 210).

Performance server 240 may identify instances in which the received performance data does not satisfy the threshold value of the performance indicator for the virtual container or for virtual machines within the virtual container. For example, performance server 240 may identify that the performance data, for a particular performance indicator (e.g., data rate), does not satisfy a threshold associated with the performance indicator (e.g., the performance data may be 110 gigabits per second (Gbps) with respect to a threshold of 100 Gbps). In some implementations, performance server 240 may send instructions to orchestration server 230 to add, remove, combine, or migrate virtual machines such that the threshold for the performance indicator is satisfied.

In one implementation, the interactions between or with servers 220-240 may be performed using the hypertext transfer protocol (HTTP) or the secure HTTP (HTTPS). In some other implementations, the interactions between or with servers 220-240 may be performed using another type of protocol, such as the transmission control protocol (TCP), the user datagram protocol (UDP), the general packet radio service (GPRS) tunneling protocol (GTP), the point-to-point protocol (PPP), the diameter protocol, the domain name system (DNS) protocol, and/or some other protocol.

Network 250 may include any type of network or a combination of networks. For example, network 250 may include a local area network (LAN), a wireless LAN (WLAN), a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), a fiber optic network, or a combination of networks. Each of client device 210, virtual container server 220, orchestration server 230, and/or performance server 240 may connect to network 250 via a wireless connection, a wired connection, or a combination thereof.

Figure 3:
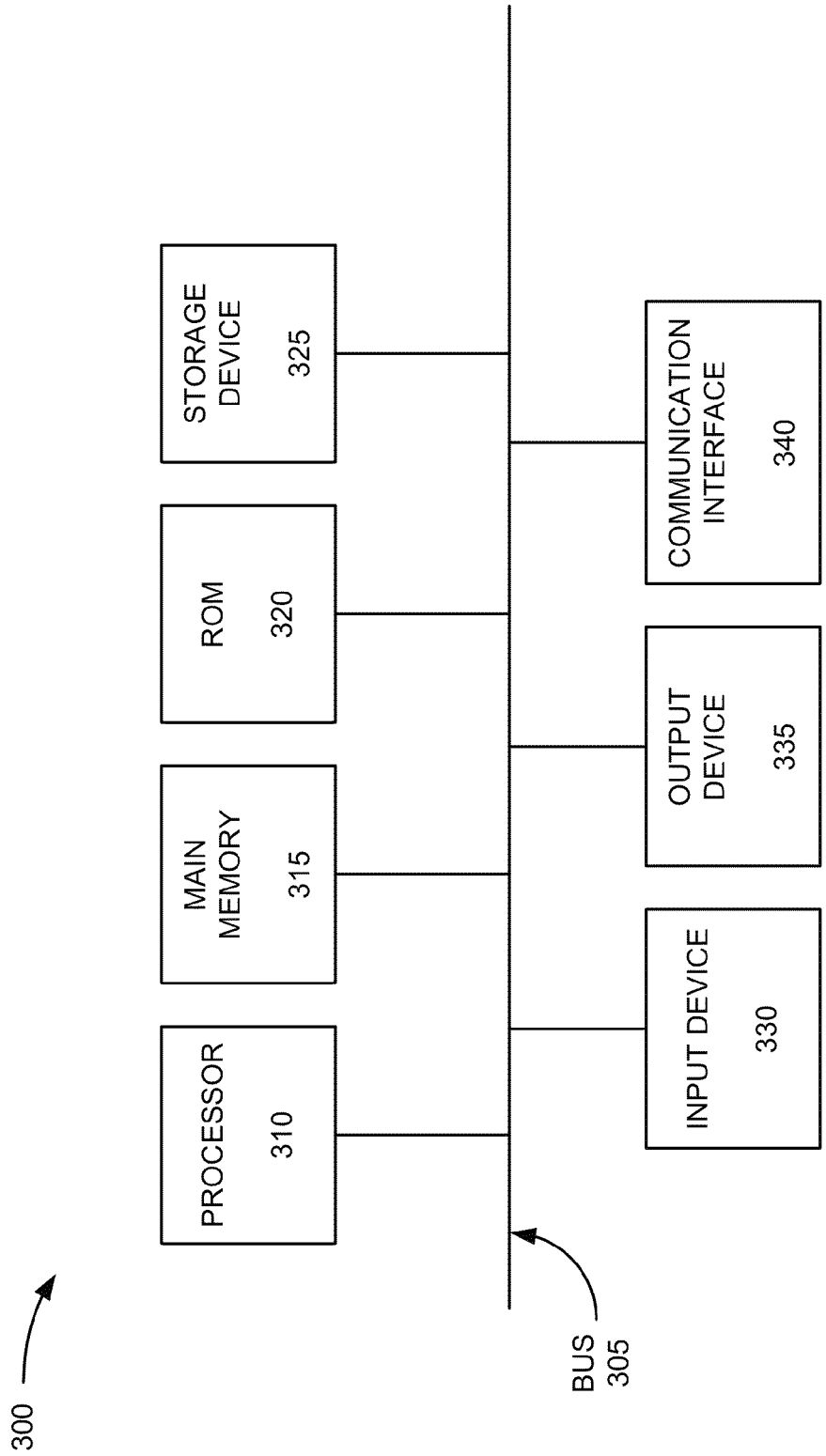
FIG. 3 illustrates example components of a device that may be used within the environment of FIG. 2.

FIG. 3 illustrates example components of a device 300 that may be used within environment 200 of FIG. 2. Device 300 may correspond to client device 210 and/or servers 220-240.

Each of client device 210 and/or servers 220-240 may include one or more devices 300, and/or one or more components of device 300.

As shown in FIG. 3, device 300 may include a bus 305, a processor 310, a main memory 315, a read only memory (ROM) 320, a storage device 325 (also referred to as a local storage device or local storage), an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
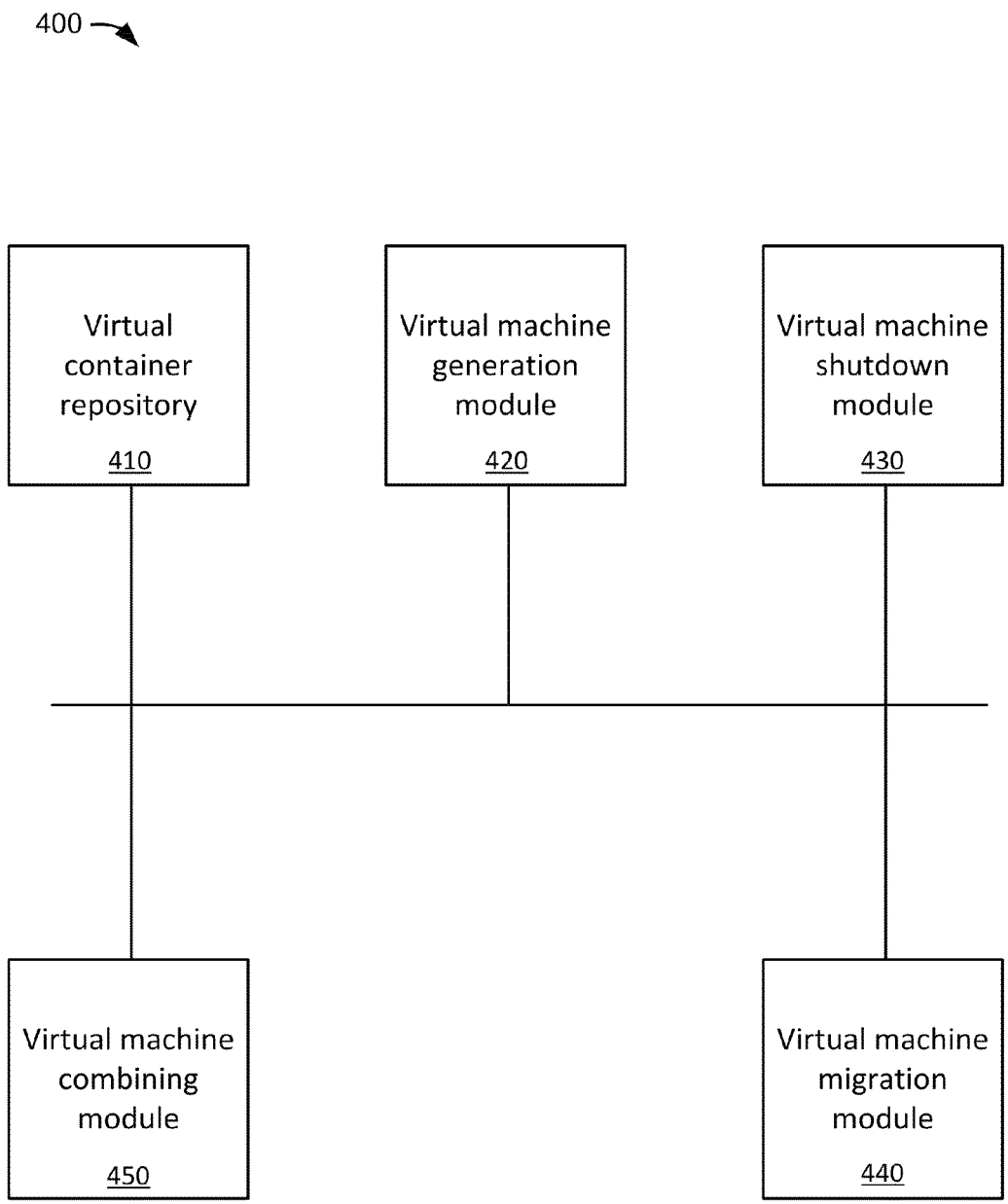
FIG. 4 illustrates example functional components of an example system.

FIG. 4 illustrates example functional components of an example system 400. In some implementations, system 400 may include functional components implemented by a device, such as orchestration server 230. In some other implementation, system 400 may include functional components implemented by one or more devices, which include or exclude orchestration server 230. For example, server 220 and/or server 240 may include some or all of the functional components of system 400.

As shown in FIG. 4, system 400 may include virtual container repository 410, virtual machine generation module 420, virtual machine shutdown module 430, virtual machine migration module 440, and/or virtual machine combining module 450.

In some implementations, virtual container repository 410 may store information associated with virtual containers stored by virtual container server 220. For example, virtual container repository 410 may store information for a virtual container, such as the type of service provided by the virtual container, a virtual IP address associated with the virtual container, and information for a virtual machine (or multiple virtual machines) associated with the virtual container (e.g., a virtual machine identifier (ID), performance data, performance indicators (e.g., thresholds), etc.). Additionally, virtual container repository 410 may store information associated with a virtual machine within a respective virtual container. For example, virtual container repository 410 may store information, such as a virtual machine ID, a geographic location associated with the virtual machine, performance indicators, and/or thresholds associated with the performance indicators.

Virtual machine generation module 420 may receive an instruction to generate a virtual machine within a virtual container. In some implementations, virtual machine generation module 420 may receive the instruction from a user, associated with virtual container server 220. Additionally, or alternatively, virtual machine generation module 420 may receive the instruction from performance server 240 based on performance data with respect to thresholds associated with the performance data. For example, virtual machine generation module 420 may receive the instruction to generate a virtual machine (e.g., VM-2) when performance server 240 identifies that the performance data, for a particular performance indicator (e.g., data rate) of an existing virtual machine (e.g., VM-1), does not satisfy a threshold associated with the performance indicator (e.g., the performance data may be 110 Gbps with respect to a threshold of less than 100 Gbps). In some implementations, the threshold may relate to when VM-1 is overloaded.

Virtual machine generation module 420 may receive the instruction to generate VM-2 in order to add a virtual machine to a respective virtual container such that the performance data of VM-1 satisfies the threshold. For example, VM-2 may be generated to add network capacity to the corresponding virtual container, thereby reducing the network load associated with VM-1. In some implementations, virtual machine generation module 420 may generate performance indicators and thresholds associated with the performance indicators for VM-2.

In some implementations, virtual machine generation module 420 may build a virtual machine with performance indicators and thresholds associated with the performance indicators, based on receiving the instruction to generate a virtual machine. Additionally, virtual machine generation module 420 may install the virtual machine in a corresponding virtual container, initiate a startup instruction of the virtual machine, and update virtual container repository 410 to store information associated with the virtual machine.

Virtual machine shutdown module 430 may receive an instruction to shut down a virtual machine within a virtual container. In some implementations, virtual machine shutdown module 430 may receive the instruction from a user, associated with virtual container server 220. Additionally, or alternatively, virtual machine shutdown module 430 may receive the instruction from performance server 240 based on performance data with respect to thresholds associated with the performance data. For example, virtual machine shutdown module 430 may receive the instruction to shut down a virtual machine when performance server 240 identifies that performance data for a virtual machine does not satisfy a threshold (e.g., the performance data for the virtual machine may be 10 gigabits per second (Gbps) with respect to a threshold of greater than 110 Gbps). In some implementations, the threshold may relate to when the virtual machine is substantially under-loaded, or substantially overloaded.

In some implementations, virtual machine shutdown module 430 may send an instruction to the virtual container, associated with the instruction to shut down a virtual machine, to stop communicating with the virtual machine, based on receiving the instruction to shut down the virtual machine. Additionally, virtual machine shutdown module 430 may send an instruction to shut down the virtual machine, receive an indication that the virtual machine has been shut down, and update virtual container repository 410 based on receiving the indication that the virtual machine has been shut down.

Virtual machine migration module 440 may receive an instruction to migrate (i.e., move) a virtual machine from one virtual container to another virtual container. For example, assume that a virtual machine (e.g., VM-1) is associated with a virtual container (e.g. VC-1). In some implementations, virtual machine migration module 440 may shut down and remove VM-1 from VC-1 (e.g., in a similar manner as described above with respect to virtual machine shutdown module 430) and generate VM-1 (e.g., in a similar manner as described above with respect to virtual machine generation module 420) in another virtual container (e.g., VC-2) based on receiving the instruction to migrate a virtual machine. In some implementations, virtual machine migration module 440 may receive the instruction from a user, associated with virtual container server 220. Additionally, or alternatively, virtual machine migration module 440 may receive the instruction from performance server 240 based on performance data with respect to thresholds associated with the performance data. In some implementations, virtual machine migration module 440 may receive the instruction from performance server 240 when performance server 240 identifies an overloaded virtual container such that virtual machine migration module 440 removes virtual machines associated with the overloaded virtual container to reduce the load of the virtual container. In some implementations, virtual machine migration module 440 may receive instructions to migrate multiple virtual machines and may prioritize the order of migration based on performance data associated with the virtual containers storing the respective multiple virtual machines (e.g., virtual machine migration may be prioritized in order of virtual machines within the most overloaded virtual containers to virtual machines within the least overloaded virtual containers, or prioritized based on some other factor).

Virtual machine combining module 450 may receive an instruction to combine multiple virtual machines into one virtual machine. For example, virtual machine combining module 450 may generate a virtual machine (e.g., in a similar manner as described above with respect to virtual machine generation module 420), based on receiving the instruction to combine multiple virtual machines, and may transfer communications between other virtual machines to the generated virtual machine. In some implementations, virtual machine combining module 450 may receive the instruction from a user, associated with virtual container server 220. Additionally, or alternatively, virtual machine combining module 450 may receive the instruction from performance server 240 based on performance data with respect to thresholds associated with the performance data. In some implementations, virtual machine combining module 450 may receive the instruction from performance server 240 when performance server 240 identifies multiple under-loaded virtual machines that may be combined (e.g., to reduce the number of virtual machines within a virtual container).

Figure 5:
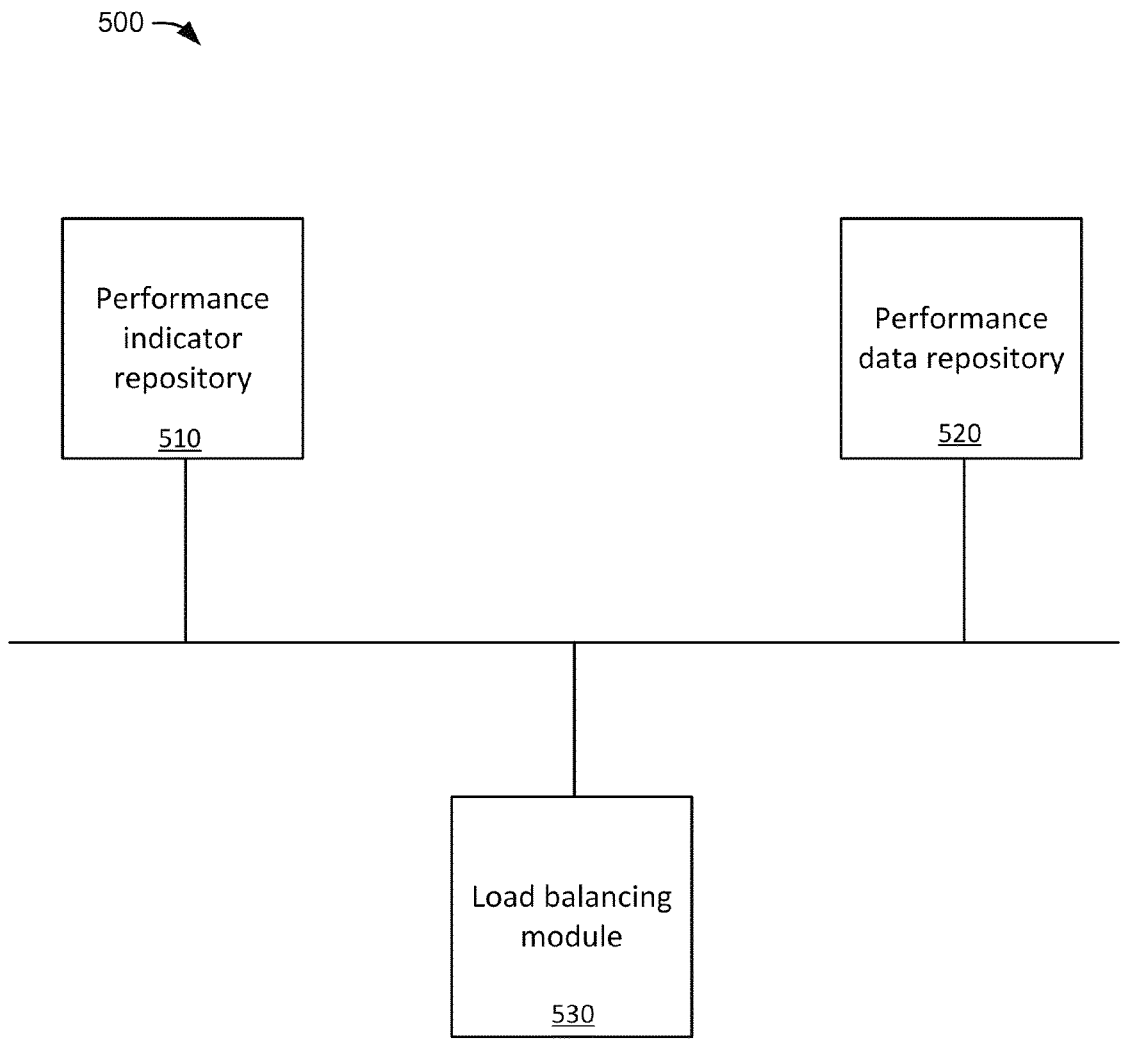
FIG. 5 illustrates example functional components of an example system.

FIG. 5 illustrates example functional components of an example system 500. In some implementations, system 500 may include functional components implemented by a server, such as performance server 240. In some other implementation, system 500 may include functional components implemented by one or more devices, which include or exclude performance server 240. For example, server 220 and/or server 230 may include some or all of the functional components of system 500.

As shown in FIG. 5, system 500 may include performance indicator repository 510, performance data repository 520, and/or load balancing module 530.

In some implementations, performance indicator repository 510 may store performance indicators (e.g., roundtrip delay, bandwidth, transfer jitter, affinity and/or anti-affinity) and corresponding thresholds for virtual machines within a virtual container. Performance indicator repository 510 may receive the performance indicators and the corresponding thresholds from virtual container server 220. Additionally, or alternatively, performance indicator repository 510 may receive the performance indicators and the corresponding thresholds from virtual machine generation module 420 based on generating a virtual machine.

Performance data repository 520 may receive performance data for corresponding performance indicators associated with performance indicator repository 510. In some implementations, performance data repository 520 may receive performance data from virtual container server 220. For example, as described above, virtual container server 220 may monitor and/or store performance data for a performance indicator (e.g., data rate) associated with a virtual container or with virtual machines within a virtual container and may provide the performance data to performance data repository 520.

Load balancing module 530 may send instructions to orchestration server 230 to generate, shut down, combine, and/or migrate virtual machines associated with a virtual container. In some implementations, load balancing module 530 may send the instructions based on information stored by performance indicator repository 510 and information stored by performance data repository 520. For example, load balancing module 530 may identify virtual machines having performance data which does not satisfy a threshold and may send instructions to orchestration server 230 to generate, shut down, and/or migrate virtual machines based on identifying virtual machines having performance data which does not satisfy the threshold.

In some implementations, a single performance indicator of a virtual machine may be associated with multiple thresholds. For example, a first threshold may relate to when the virtual machine is considered to be overloaded, a second threshold may relate to when the virtual machine is considered to be substantially overloaded, and third threshold may relate when the virtual machine is considered to be substantially under-loaded. Load balancing module 530 may identify instances in which the performance data does not satisfy a threshold, and may send an instruction to orchestration server 230 to generate, shut down, and/or migrate virtual machines associated with a virtual container based on identifying instances in which the performance data does not satisfy a threshold. Additionally, or alternatively, load balancing module 530 may send an alarm to virtual container server 220 based on identifying performance data that does not satisfy a threshold.

In some implementations, load balancing module 530 may send an instruction to orchestration server 230 to generate a virtual machine based on identifying that the performance data for a particular performance indicator (e.g., data rate) for a virtual machine (e.g., VM-1) does not satisfy a threshold associated with the performance indicator. In some implementations, the threshold may relate to when the virtual machine is considered to be overloaded. For example, assume that the performance data for VM-1 is 110 Gbps with respect to a threshold of less than 100 Gbps. Load balancing module 530 may send an instruction to orchestration server 230 to generate a virtual machine (e.g., VM-2) such that the performance data for VM-1 satisfies the threshold. For example, network load, associated with VM-1, may be transferred to VM-2 such that the performance data, for the data rate performance indicator, satisfies the threshold.

In some implementations, load balancing module 530 may send instructions to orchestration server 230 to shut down a virtual machine based on identifying that performance data for a particular performance indicator (e.g., data rate) for a virtual machine does not satisfy a threshold associated with the performance indicator. In some implementations, the threshold may relate when the virtual machine is considered to be substantially overloaded, thereby causing load balancing module 530 to send an instruction to shut down the virtual machine (e.g., to prevent the virtual machine and/or the virtual container associated with the virtual machine from malfunctioning). For example, assume that the performance data for a virtual machine is 170 Gbps with respect to a threshold of less than 150 Gbps for the data rates performance indicator. Load balancing module 530 may send instructions to shut down the virtual machine based on identifying that the performance data does not satisfy the threshold.

In some implementations, load balancing module 530 may send instructions to orchestration server 230 to shut down a virtual machine based on identifying that performance data does not satisfy a threshold relating to when the virtual machine is considered to be substantially under-loaded. For example, assume that the performance data for a virtual machine is 2 Gbps with respect to a threshold of greater 20 Gbps. In some implementations, load balancing module 530 may send instructions to shut down the virtual machine based on identifying the performance data for a particular performance indicator (e.g., data rate) for a virtual machine does not satisfy a threshold associated with the performance indicator (e.g., to remove a substantially under-loaded virtual machine to create space in the corresponding virtual container).

In some implementations, load balancing module 530 may send an instruction to orchestration server 230 to combine multiple virtual machines into a single virtual machine. For example, load balancing module 530 may send an instruction to combine multiple substantially under-loaded virtual machines into a single virtual machine or combine an overloaded virtual machine with a substantially under-loaded virtual machine. Additionally, or alternatively, load balancing module 530 may send an instruction to migrate a virtual machine from one virtual container to another virtual container.

Figure 6:
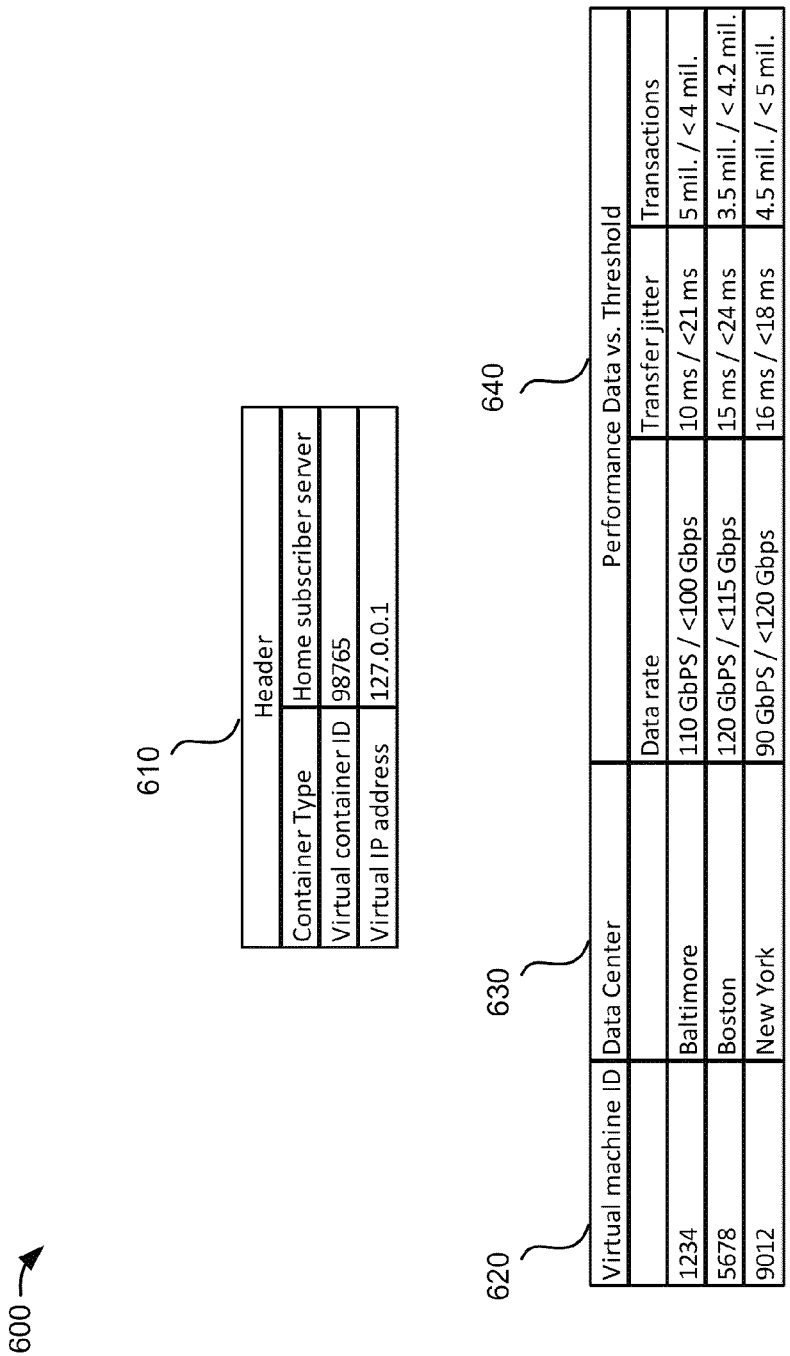
FIG. 6 illustrates an example data structure that may be stored by one or more servers, such as an orchestration server.

FIG. 6 illustrates an example data structure 600 that may be stored by one or more servers, such as orchestration server 230. In one implementation, data structure 600 may be stored in a memory of orchestration server 230. In another implementation, data structure 600 may be stored in a memory separate from, but accessible by orchestration server 230. Each entry, associated with data structure 600, may correspond to information for a virtual machine associated with a virtual container. In some implementations, orchestration server 230 may store multiple data structures 600, such that each data structure 600 may store information for virtual machines associated with a particular virtual container.

A particular instance of data structure 600 may contain different information and/or fields than another instance of data structure 600. Additionally, or alternatively, some portions of data structure 600 may be stored by performance server 240 based on receiving information associated with a corresponding virtual machine. In some implementations, data structure 600 may correspond to information stored by virtual container repository 410, performance indicator repository 510, and/or data receiving module 520.

As shown in FIG. 6, data structure 600 may include header field 610, virtual machine identifier (ID) field 620, data center field 630, and/or performance data vs. threshold field 640. In some implementations, data structure 600 may include additional fields, fewer fields, different fields, or differently arranged fields than are shown in FIG. 6.

Header field 610 may store information identifying the particular virtual container stored by data structure 600. As described above, orchestration server 230 may store multiple data structures 600, such that each data structure 600 may store information for virtual machines associated with a particular virtual container. In some implementations, header field 610 may store information to identify the type of virtual container (e.g., the service and/or function provided by the virtual machines associated with the virtual container). In the example shown in FIG. 6, header field 610 may store the virtual container type "Home subscriber server" to indicate that the virtual container associated with data structure 600, includes virtual machines to provide services and/or functionality associated with a home subscriber server (e.g., a server to store user account information, billing information, etc. associated with subscribers of a service, such as home telephone services or some other service).

Header field 610 may also store a virtual container identifier (ID) (e.g., a character string) to identify the virtual container stored by data structure 600 and/or to identify the particular virtual container server 220 storing the virtual container. For example, header field 610 may store the virtual container ID "98765" or some other character string. While the example shown in FIG. 6 shows a 5-digit numerical character string, header field 610 may store any character string of any length.

Header field 610 may also store a virtual IP address associated with the virtual container of data structure 600. In some implementations, client device 210 may communicate with the virtual container and the virtual machines within the virtual container based on the virtual IP address. Client device 210 may communicate with a single virtual container via the virtual IP address in lieu of communicating with multiple devices which may have multiple different IP addresses.

Virtual machine ID field 620 may include a character string to identify a virtual machine stored by the virtual container associated with data structure 600. For example, virtual machine ID field 620 may store the character string "1234" or some other character string. While the example shown in FIG. 6 shows a 4-digit numerical character string, virtual machine ID field 620 may store any character string of any length.

Data center field 630 may store a description of a geographic location associated with a corresponding virtual machine. For example, as described above, a virtual container may include virtual machines associated with multiple geographic locations (e.g., data centers, associated with one or geographic locations). In an example shown in FIG. 6, data center field 630 may store a description of "Baltimore" associated with the virtual machine having the virtual machine ID "1234."

Performance data vs. threshold field 640 may store information identifying performance indicators, performance data, and/or thresholds associated with a corresponding virtual machine. For example, as shown in FIG. 6, performance data vs. threshold field 640 may store performance indicators, such as data rate, transfer jitter, and transactions. Performance data vs. threshold field 640 may store additional or fewer performance indicators than what are shown. Additionally, performance data vs. threshold field 640 may store performance data received by virtual container server 220 and thresholds associated with the performance data. For example, performance data vs. threshold field 640 may store a performance indicator (e.g., data rate), performance data (e.g., 110 Gbps) corresponding to the performance indicator, and a threshold (100 Gbps) corresponding to the performance data and the performance indicator for a particular virtual machine (e.g., the virtual machine associated with virtual machine ID "1234").

As described above, load balancing module 530 may identify overloaded and/or under-loaded virtual machines based on performance data with respect to thresholds associated with the performance data. While only one threshold is shown for each performance indicator for each virtual machine, in practice, it will be apparent that performance data vs. threshold field 640 may store multiple thresholds corresponding to different triggers associated with load balancing module 530. For example, as described above, a first threshold may cause load balancing module 530 to send an instruction to orchestration server 230 to add a virtual machine, a second threshold may cause load balancing module 530 to send an instruction to orchestration server 230 to shut down a virtual machine, and some other threshold may cause load balancing module 530 to send some other instruction.

Figure 7:
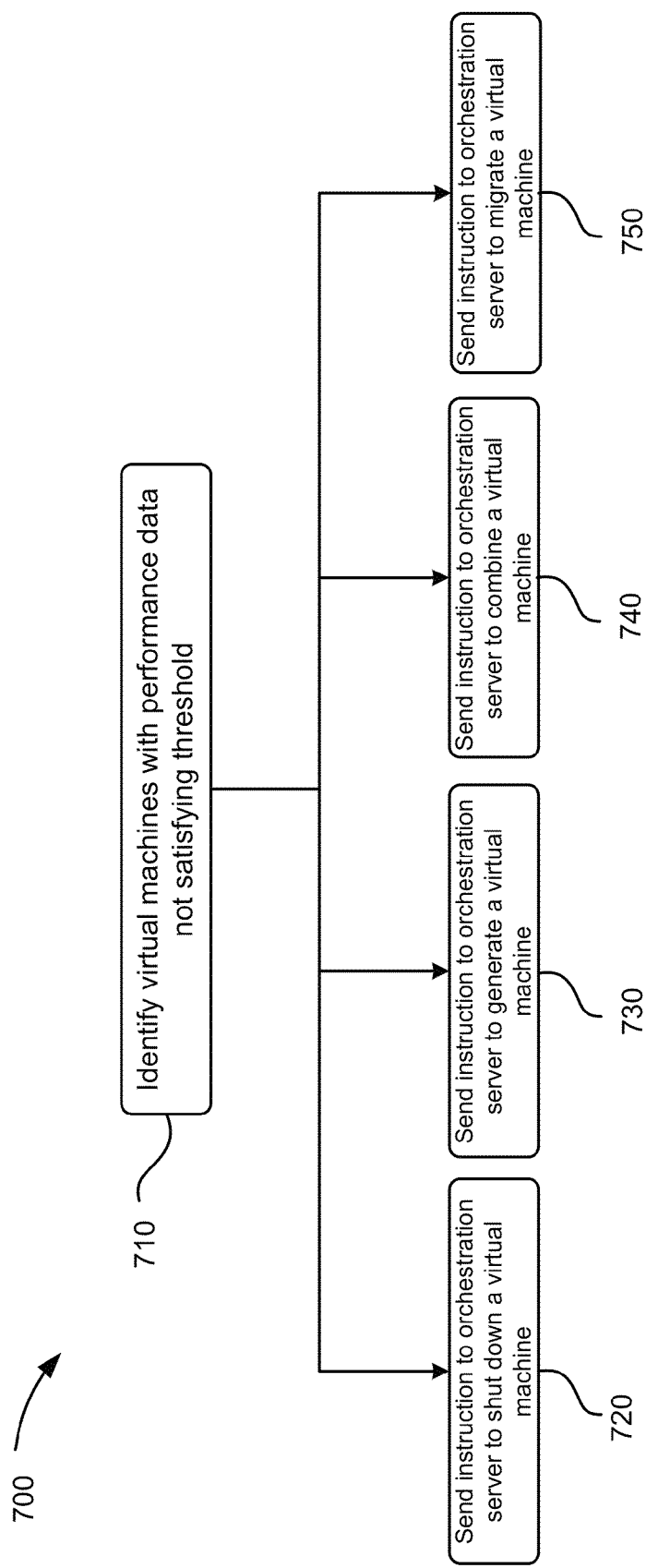
FIG. 7 illustrates a flowchart of an example process for balancing network load.

FIG. 7 illustrates a flowchart of an example process 700 for balancing network load. In one implementation, process 700 may be performed by one or more components of performance server 240, such as processor 310 of performance server 240. In another implementation, one or more blocks of process 700 may be performed by one or more components of another device (e.g., server 220 and/or server 230), or a group of devices including or excluding performance server 240.

Process 700 may include identifying virtual machines with performance data not satisfying a threshold (block 710). For example, as described above with respect to load balancing module 530, performance server 240 may identify virtual machines having performance data which does not satisfy a threshold and may send instructions to orchestration server 230 to generate, shut down, migrate, and/or combine virtual machines based on identifying performance data which does not satisfy the threshold.

Process 700 may also include sending instructions to orchestration server 230 to shut down a virtual machine (block 720). For example, as described above with respect to load balancing module 530, performance server 240 may send instructions to orchestration server 230 to shut down a virtual machine based on identifying that performance data, for a particular performance indicator (e.g., data rate) for a virtual machine, does not satisfy a threshold associated with the performance indicator. In some implementations, the threshold may relate to when the virtual machine is considered to be substantially overloaded, thereby causing load balancing module 530 to send an instruction to shutdown the virtual machine (e.g., to prevent the virtual machine and/or the virtual container, associated with the virtual machine, from malfunctioning). In some implementations, performance server 240 may send instructions to orchestration server 230 to shut down the virtual machine based on identifying that the performance data, for a particular performance indicator (e.g., data rate) for a virtual machine, does not satisfy a threshold associated with the performance indicator (e.g., to remove an under-loaded virtual machine to create space in the corresponding virtual container).

Process 700 may also include sending an instruction to orchestration server 230 to generate a virtual machine (block 730). For example, as described above with respect to load balancing module 530, orchestration server 230 may send an instruction to orchestration server 230 to generate a virtual machine based on identifying that the performance data, for a particular performance indicator (e.g., data rate) for a virtual machine (e.g., VM-1), does not satisfy a threshold associated with the performance indicator. In some implementations, the threshold may relate to when the virtual machine is considered to be overloaded. Performance server 240 may send an instruction to orchestration server 230 to generate a virtual machine (e.g., VM-2) such that the performance data for VM-1 satisfies the threshold.

Process 700 may further include sending an instruction to orchestration server 230 to combine virtual machines (block 740). For example, as described above with respect to load balancing module 530, performance server 240 may send an instruction to combine multiple virtual machines into a single virtual machine. For example, performance server 240 may combine multiple substantially under-loaded virtual machines into a single virtual machine or combine an overloaded virtual machine with an under-loaded virtual machine.

Process 700 may further include sending an instruction to orchestration server 230 to migrate a virtual machine (block 750). For example, as described above with respect to virtual machine migration module 440, performance server 240 may send an instruction to migrate one virtual machine (e.g., VM-1) from one virtual container (e.g., VC-1) to another virtual container (e.g., VC-2). As described above, performance server 240 may send an instruction to orchestration server 230 to shutdown VM-1 (e.g., a virtual machine associated with VC-1), in accordance with block 720, and may send an instruction to generate VM-1 (e.g., a virtual machine associated with VC-2), in accordance with block 730, thereby migrating VM-1 from VC-1 to VC-2.

Figure 8:
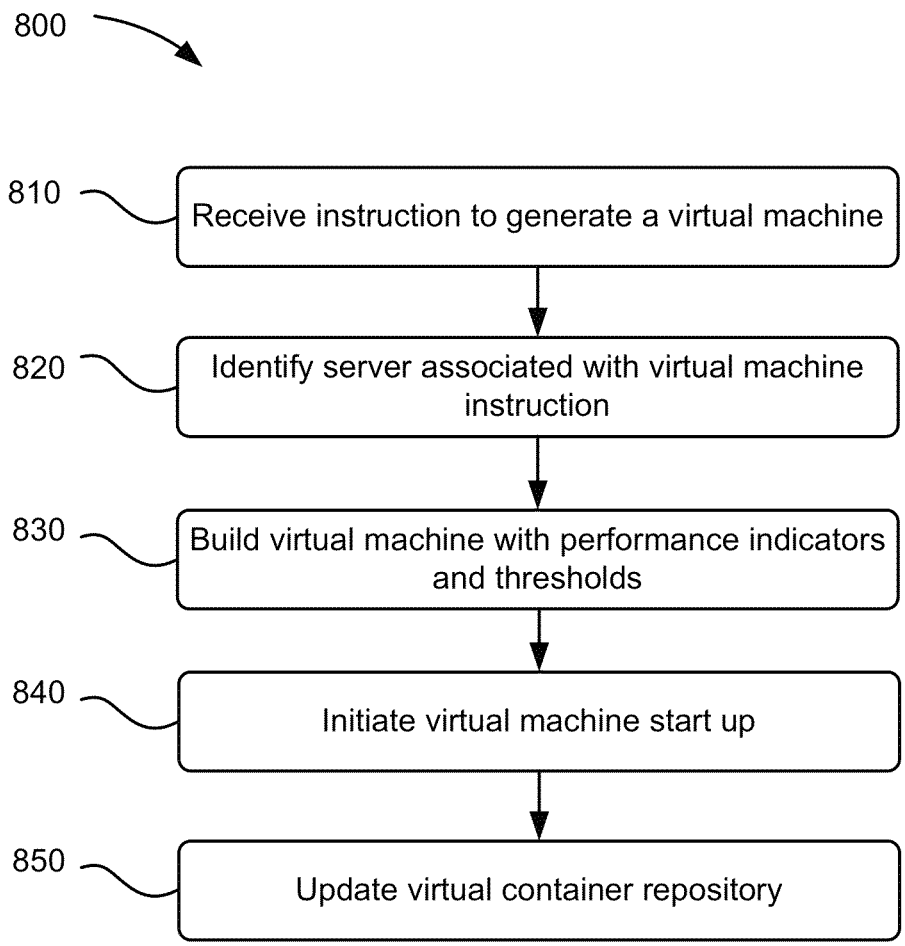
FIG. 8 illustrates a flowchart of an example process for adding a virtual machine in a virtual container.

FIG. 8 illustrates a flowchart of an example process 800 for adding a virtual machine in a virtual container. In one implementation, process 800 may be performed by one or more components of orchestration server 230, such as processor 310 of orchestration server 230. In another implementation, one or more blocks of process 800 may be performed by one or more components of another device (e.g., server 220 and/or server 240), or a group of devices including or excluding orchestration server 230.

Process 800 may include receiving an instruction to generate a virtual machine (block 810). For example, orchestration server 230 may receive an instruction to generate a virtual machine based on performance server 240 identifying a virtual machine (e.g., an overloaded virtual machine) having performance data that does not satisfy a threshold. Additionally, or alternatively, orchestration server 230 may receive an instruction from some other source (e.g., from a user associated with client device 210 and/or virtual container server 220). In some implementations, the virtual machine may be generated in a virtual container associated with virtual container server 220.

Process 800 may further include identifying the server associated with the virtual machine instruction (block 820).

In some implementations, orchestration server 230 may identify the server associated with the virtual machine instruction (e.g., the particular virtual container server 220 storing the virtual container associated with the virtual machine) based on information stored by data structure 600 and/or virtual container repository 410. For example, assume that the virtual machine instruction is associated with virtual machine VM-1 (e.g., the instruction causes the generation of a virtual machine to reduce the load of VM-1). Orchestration server 230 may identify the server associated with VM-1 (e.g., based on a virtual machine ID associated with VM-1 and stored by data structure 600 and/or virtual container repository 410).

Process 800 may also include building the virtual machine with performance indicators and thresholds (block 830). For example, orchestration server 230 may build the virtual machine, associated with the virtual machine instruction, and may include performance indicators and thresholds in the virtual machine. In some implementations, the performance indicators and thresholds may be user-defined. In some other implementations, the performance indicators and thresholds may be automatically determined based on performance data associated with the virtual container associated with the virtual machine. In some implementations orchestration server 230 may assign a virtual machine ID for the virtual machine, install the virtual machine within a virtual container stored by virtual container server 220, and notify the virtual container associated with the virtual machine, of the generated virtual machine.

Process 800 may also include initiating virtual machine start up (block 840). For example, orchestration server 230 may send an instruction to virtual container server 220, associated with the virtual machine, to start up the virtual machine based on installing the virtual machine in a virtual container stored by virtual container server 220. In some implementations, the instruction may cause virtual container server 220 to perform a performance test function on the virtual machine to ensure that the virtual machine is working properly.

Process 800 may further include updating the virtual container repository (block 850). In some implementations, orchestration server 230 may update virtual container repository 410 based on initiating virtual machine start up as described above. For example, orchestration server 230 may update the information stored by virtual container repository 410 to include information associated with the virtual machine (e.g., virtual machine ID, performance indicators, and/or thresholds).

Figure 9:
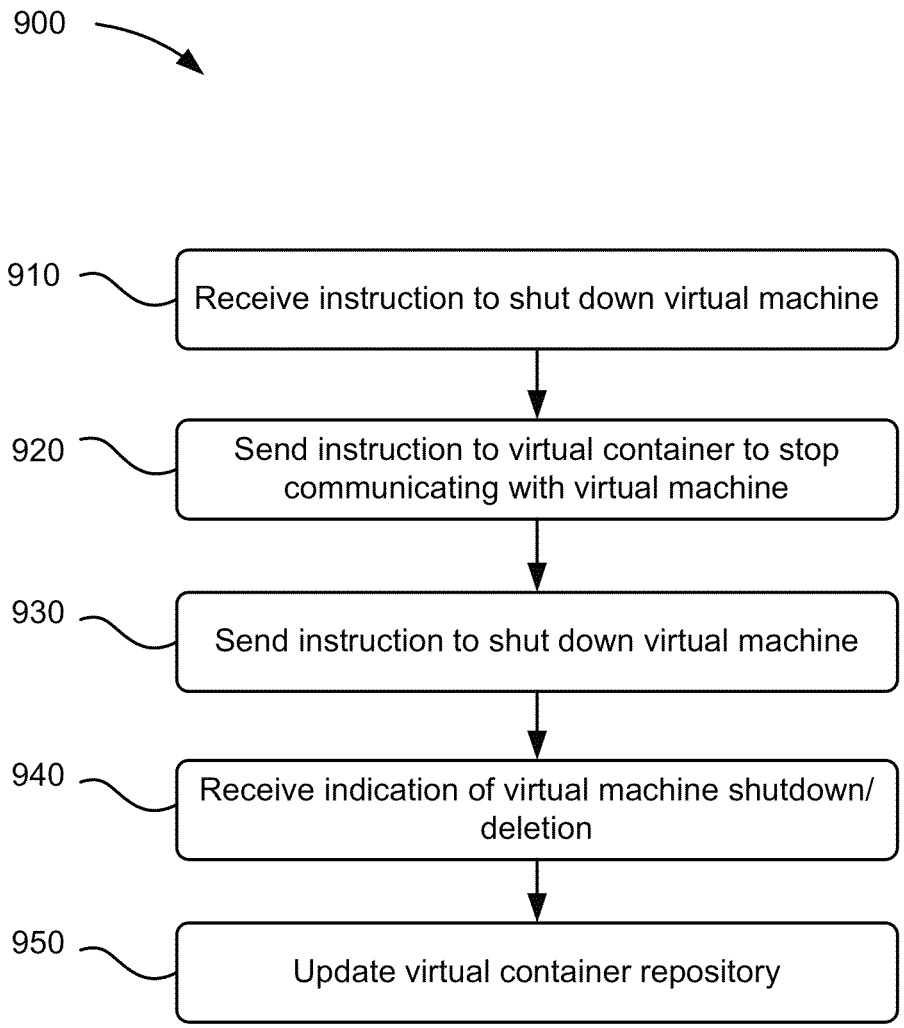
FIG. 9 illustrates a flowchart of an example process for removing a virtual machine in a virtual container.

FIG. 9 illustrates a flowchart of an example process 900 for removing a virtual machine from a virtual container. In one implementation, process 900 may be performed by one or more components of orchestration server 230, such as processor 310 of orchestration server 230. In another implementation, one or more blocks of process 900 may be performed by one or more components of another device (e.g., server 220 and/or server 240), or a group of devices including or excluding orchestration server 230.

Process 900 may include receiving an instruction to shut down a virtual machine (process 910). For example, orchestration server 230 may receive an instruction to shut down a virtual machine from performance server 240 based on performance server 240 identifying that a virtual machine (e.g., a substantially overloaded virtual machine or a substantially under-loaded virtual machine) having performance data that does not satisfy a threshold. Additionally, or alternatively, orchestration server 230 may receive the instruction from some other source (e.g. from a user associated with orchestration server 230).

Process 900 may also include sending an instruction to the virtual container to stop communicating with virtual machine (block 920). In some implementations, orchestration server 230 may send the instruction to the virtual container, associated with the virtual machine, to stop communicating with the virtual machine. For example, as described above, client device 210 may communicate with a virtual machine (e.g., VM-1) via a virtual container to perform some task. Orchestration server 230 may send the instruction to the virtual container, associated with VM-1, to stop communicating with VM-1 such that VM-1 may be shut down. In some implementations, virtual container may redistribute communications, associated with VM-1, to another virtual machine (e.g., VM-2) within the virtual container such that client device 210 may communicate with VM-2, via the virtual container, to perform a task.

Process 900 may further include sending an instruction to shut down the virtual machine (block 930). For example, orchestration server 230 may send an instruction to shut down the virtual machine based on receiving the instruction to shut down the virtual machine and based on sending an instruction to the virtual container, associated with the virtual machine to stop communicating with the virtual machine.

Process 900 may also include receiving an indication of virtual machine shutdown (block 940). For example, orchestration server 230 may receive an indication of virtual machine shutdown from virtual container server 220 responsible for storing the virtual container associated with the virtual machine. In some implementations, orchestration server 230 may receive an indication that the virtual machine has been deleted, in addition to being shut down.

Process 900 may further include updating the virtual container repository (block 950). For example, orchestration server 230 may update virtual container repository 410 based on receiving an indication of virtual machine shutdown and/or deletion from the virtual container, associated with the virtual machine. In some implementations, orchestration server 230 may delete information associated with the virtual machine from virtual machine repository 410.

Process 900 may be performed by orchestration server 230 to shut down and/or delete a virtual machine from a virtual container. In some implementations, some blocks of process 900 may be omitted to expedite the execution of process 900 by orchestration server 230. For example, block 920 may be omitted such that orchestration server 230 causes a virtual machine to be shut down in an expedited manner (e.g., to prevent damage to the virtual container or virtual container server 220 associated with a substantially overloaded virtual machine).

In some implementations, orchestration server 230 may perform some portions of processes 800-900 to combine multiple virtual machines into a single virtual machine. For example, orchestration server 230 may generate a virtual machine (e.g. VM-1) in accordance with process 800, and may shut down multiple virtual machines (e.g., VM-2 and VM-3) in accordance with process 900. Additionally, orchestration server 230 may cause VM-1 to receive communications associated with VM-2 and VM-3 such that VM-2 and VM-3 no longer communicate with the corresponding virtual container, thereby allowing VM-2 and VM-3 to be shut down.

Figure 10:
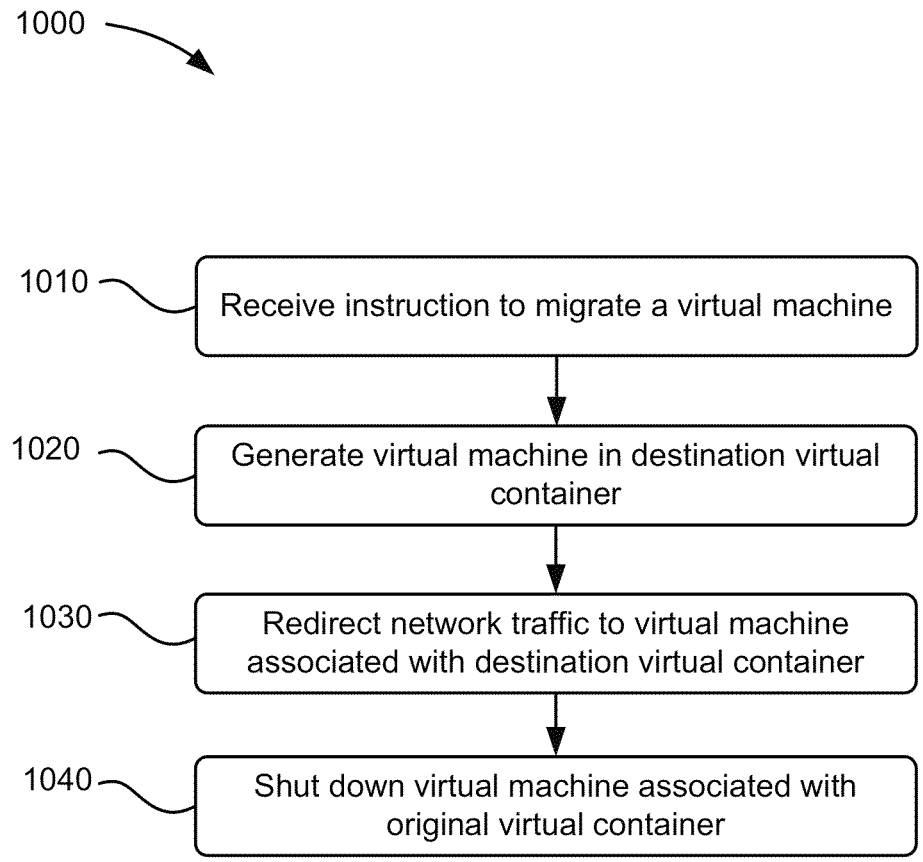
FIG. 10 illustrates a flowchart of an example process for migrating a virtual machine from one virtual container to another virtual container.

FIG. 10 illustrates a flowchart of an example process 1000 for migrating a virtual machine from one virtual container to another virtual container. In one implementation, process 1000 may be performed by one or more components of orchestration server 230, such as processor 310 of orchestration server 230. In another implementation, one or more blocks of process 1000 may be performed by one or more components of another device (e.g., server 220 and/or server 240), or a group of devices including or excluding orchestration server 230.

Process 1000 may include receiving an instruction to migrate a virtual machine (block 1010). For example, as described above with respect to virtual machine migration module 440, orchestration server 230 may receive the instruction from performance server 240 to move a virtual machine (e.g., VM-1) from an origin virtual container (e.g., VC-1) to a destination virtual container (e.g., VC-2). In some implementations, orchestration server 230 may receive the instruction to migrate the virtual machine to reduce the network load associated with VC-1 while allowing the virtual machine to continue to provide services (e.g., data forwarding services, etc.) to client device 210 via VC-2.

In some implementations, orchestration server 230 may receive an instruction to migrate multiple virtual machines and may prioritize the order of migration based on performance data associated with the virtual containers storing the respective multiple virtual machines (e.g., virtual machine migration may be prioritized in order of virtual machines within the most overloaded virtual containers to virtual machines within the least overloaded virtual containers, or prioritized based on some other factor).

Process 1000 may also include generating a virtual machine in the destination virtual container (block 1020). For example, orchestration server 230 may generate a virtual machine (e.g., VM-2), in a manner similar to that described above with respect to process 800, within the destination virtual container (i.e., VC-2).

Process 1000 may further include redirect network traffic to the virtual machine associated with the destination virtual container (block 1030). For example, orchestration server 230 may instruct VM-2 to communicate with client device 210 (e.g., to provide client device with services) and may instruct VM-1 to stop communicating with client device 210, thereby redirecting network traffic, associated with VM-1, to VM-2.

Process 1000 may also include shutting down the virtual machine associated with the original virtual container (block 1040). For example, orchestration server 230 may shut down VM-1, associated with VC-1, in a manner similar to that described above with respect to process 900. As a result, services provided by VM-1 within VC-1 may be transferred to VM-2 within VC-2, thereby reducing the network load of VC-1.

As described above, client device 210 may perform a task by communicating with a single virtual container having a single virtual IP address and associated with multiple virtual machines, in lieu of communicating with multiple physical devices having multiple IP addresses, thereby reducing network traffic. Performance server 240 may identify virtual machines having performance data (e.g., information associated with network load when a virtual machine communicates with client device 210) not satisfying a threshold, and may communicate with orchestration server 230 to rebalance network load associated with multiple virtual containers and/or virtual machines such that the performance data of virtual containers and/or virtual machines satisfies the threshold. A virtual container may include virtual machines associated with multiple geographic locations, thereby allowing for network load balancing functions across the multiple geographic locations.

The foregoing description provides illustration and description, but is not intended to be exhaustive or to limit the possible implementations to the precise form disclosed. Modifications and variations are possible in light of the above disclosure or may be acquired from practice of the implementations. For example, while series of blocks have been described with regards to FIG. 7-10, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a first server, a performance indicator associated with a first virtual machine,
     the first virtual machine being stored by a first virtual machine server,
     the first virtual machine being capable of communicating with a client device;
   determining, by the first server, whether the performance indicator satisfies a first threshold that indicates the first virtual machine is overloaded;
   sending, by the first server, an instruction to a second server to generate a second virtual machine based on determining that the first virtual machine is overloaded and not substantially overloaded,
     the second virtual machine being capable of communicating with the client device,
     the second virtual machine being stored by a second virtual machine server;
   instructing, by the first server and based on determining the first virtual machine is overloaded and not substantially overloaded, the second virtual machine to communicate with the client device to reduce network load associated with the first virtual machine,
   determining, by the first server, whether the performance indicator satisfies a second threshold that indicates the first virtual machine is substantially overloaded,
     the second threshold being different than the first threshold;
   sending, by the first server, an instruction to the second server to cause the first virtual machine to shut down based on determining the first virtual machine is substantially overloaded;

sending, by the first server, an instruction to the second server to generate a third virtual machine based on determining that the first virtual machine is substantially overloaded,
    the third virtual machine being stored by a third virtual machine server,
    the third virtual machine being capable of communicating with the client device; and
instructing, by the first server, the third virtual machine to communicate with the client device on behalf of the first virtual machine.

2. The method of claim 1, further comprising:
determining whether the performance indicator satisfies a third threshold that indicates the first virtual machine is substantially under-loaded,
    the third threshold being different than the first threshold and the second threshold; and
sending an instruction to the second server to cause the first virtual machine to shut down based on determining that the first virtual machine is substantially under-loaded.

3. The method of claim 1, further comprising:
determining whether the performance indicator satisfies a third threshold that indicates that the first virtual machine is substantially under-loaded,
    the third threshold being different from the first threshold and the second threshold;
receiving performance data associated with a fourth virtual machine,
    the fourth virtual machine being stored by a fourth virtual machine server,
    the fourth virtual machine being capable of communicating with the client device;
determining that the fourth virtual machine is substantially under-loaded based on the performance data associated with the fourth virtual machine;
sending an instruction to the second server to cause the first virtual machine to shut down based on determining that the first virtual machine is substantially under-loaded;
sending an instruction to the second server to cause the fourth virtual machine to shut down based on determining that the fourth virtual machine is substantially under-loaded;
sending an instruction to the second server to generate a fifth virtual machine based on sending the instruction to the second server to cause the first virtual machine to shut down and sending the instruction to the second server to cause the fourth virtual machine to shut down,
    the fifth virtual machine being stored by a fifth virtual machine server,
    the fifth virtual machine capable of communicating with the client device; and
instructing the fifth virtual machine to communicate with the client device on behalf of the first virtual machine and the fourth virtual machine.

4. The method of claim 1, where the first virtual machine and the second virtual machine are associated with a single network address,
    the client device capable of communicating with the first virtual machine or the second virtual machine via the single network address.

5. The method of claim 1, where the first virtual machine and the second virtual machine provide a same service to different geographic locations.

6. A system comprising:
a first server to:
    receive performance data associated with a first virtual machine,
        the first virtual machine being capable of communicating with a client device,
        the first virtual machine being included in a virtual container of a plurality of virtual containers,
        each of the plurality of virtual containers being associated with a respective service,
        each of the plurality of virtual containers including at least one virtual machine that provides the respective service,
        the first virtual machine being associated with a first virtual machine server;
    determine that the first virtual machine is overloaded when the performance data indicates a first threshold is satisfied and determine that the first virtual machine is under-loaded when the performance data indicates a second threshold is satisfied,
        the first threshold being different than the second threshold;
    send an instruction to a second server to generate a second virtual machine, to be included in the virtual container and to be associated with a second virtual machine server, based on determining that the first virtual machine is overloaded,
        the second virtual machine providing the same service as the first virtual machine,
        the second virtual machine being capable of communicating with the client device;
    instruct the second virtual machine to communicate with the client device to reduce network load associated with the first virtual machine;
    send an instruction to the second server to cause the first virtual machine to shut down based on determining that the first virtual machine is substantially under-loaded;
    determine that the first virtual machine is substantially overloaded based on the performance data indicating a third threshold is satisfied,
        the third threshold being different than the first threshold and the second threshold;
    send an instruction to the second server to cause the first virtual machine to shut down based on determining that the first virtual machine is substantially overloaded;
    send an instruction to the second server to generate a third virtual machine based on determining that the first virtual machine is substantially overloaded,
        the third virtual machine being associated with a third virtual machine server,
        the third virtual machine being capable of communicating with the client device; and
    instruct the third virtual machine to communicate with the client device on behalf of the first virtual machine.

7. The system of claim 6, where the first server is further to:
receive performance data associated with a fourth virtual machine,
    the fourth virtual machine being capable of communicating with the client device,
    the fourth virtual machine being associated with a fourth virtual machine server and being included in the virtual container;
determine that the fourth virtual machine is substantially under-loaded based on the performance data associated with the fourth virtual machine;
send an instruction to the second server to cause the first virtual machine to shut down based on determining that the first virtual machine is substantially under-loaded;

send an instruction to the second server to cause the fourth virtual machine to shut down based on determining that the fourth virtual machine is substantially under-loaded;
send an instruction to the second server to generate a fifth virtual machine based on sending the instruction to the second server to cause the first virtual machine to shut down and sending the instruction to the second server to cause the fourth virtual machine to shut down,
the fifth virtual machine being associated with a fifth virtual machine server and being included in the virtual container,
the fifth virtual machine server being the first virtual machine server, the third virtual machine server, or another virtual machine server,
the fifth virtual machine capable of communicating with the client device; and
instruct the fifth virtual machine to communicate with the client device on behalf the first virtual machine and the fourth virtual machine.

8. The system of claim 6, where each of the plurality of virtual containers is associated with a respective network address,
the virtual container being associated with a single network address,
the client device capable of communicating with the first virtual machine and the second virtual machine via the single network address.

9. The system of claim 6, where the first virtual machine and the second virtual machine provide the same service to different geographic locations.

10. A non-transitory computer-readable medium comprising:
a plurality of instructions, which, when executed by one or more processors associated with a first server, cause the one or more processors to:
receive a performance indicator associated with a first virtual machine,
the first virtual machine being associated with a first virtual machine server,
the first virtual machine being capable of communicating with a client device;
determine whether the performance indicator satisfies a first threshold that indicates the first virtual machine is overloaded and does not satisfy a second threshold that indicates the first virtual machine is substantially overloaded;
send an instruction to a second server to generate a second virtual machine based on determining that the first virtual machine is overloaded and not substantially overloaded,
the second virtual machine being associated with a second virtual machine server,
the second virtual machine being capable of communicating with the client device;
instruct the second virtual machine to communicate with the client device to reduce network load associated with the first virtual machine,
the first virtual machine and the second virtual machine being associated with a single network address,
the client device capable of communicating with the first virtual machine and the second virtual machine via the single network address;
determine whether the first virtual machine is substantially overloaded or substantially under-loaded based on the performance indicator;
send an instruction to the second server to cause the first virtual machine to shut down based on determining that the first virtual machine is substantially overloaded;
send an instruction to the second server to generate a third virtual machine based on determining that the first virtual machine is substantially overloaded,
the third virtual machine being associated with a third virtual machine server,
the third virtual machine being capable of communicating with the client device; and
instruct the third virtual machine to communicate with the client device on behalf of the first virtual machine.

11. The non-transitory computer-readable medium of claim 10, where the plurality of instructions further cause the one or more processors to:
send an instruction to the second server to cause the first virtual machine to shut down based on determining that the first virtual machine is substantially under-loaded.

12. The non-transitory computer-readable medium of claim 10, where the plurality of instructions further cause the one or more processors to:
determine that the first virtual machine is substantially under-loaded based on the performance indicator;
receive a performance indicator associated with a fourth virtual machine,
the fourth virtual machine being associated with a fourth virtual machine server,
the fourth virtual machine being capable of communicating with the client device;
send an instruction to the second server to cause the first virtual machine to shut down based on determining that the first virtual machine is substantially under-loaded;
send an instruction to the second server to cause the fourth virtual machine to shut down based on determining that the fourth virtual machine is substantially under-loaded;
send an instruction to the second server to generate a fifth virtual machine based on sending the instruction to the second server to cause the first virtual machine to shut down and sending the instruction to the second server to cause the fourth virtual machine to shut down,
the fifth virtual machine being associated with a fifth virtual machine server,
the fifth virtual machine capable of communicating with the client device; and
instruct the fifth virtual machine to communicate with the client device on behalf the first virtual machine and the fourth virtual machine.

13. The non-transitory computer-readable medium of claim 10, where the first virtual machine and the second virtual machine provide a same service to different geographic locations.

* * * * *